March 20, 1951 B. S. PARKER 2,545,894

NONINTERCEPTIVE RADIO COMMUNICATION SYSTEM

Filed May 9, 1947

Inventor:
Bessie S. Parker
By Charles R. Fay,
Attorney

Patented Mar. 20, 1951

2,545,894

UNITED STATES PATENT OFFICE 2,545,894

NONINTERCEPTIVE RADIO COMMUNICATION SYSTEM

Bessie S. Parker, Royalston, Mass.

Application May 9, 1947, Serial No. 747,001

6 Claims. (Cl. 250—8)

This invention relates to automatic transmitting devices in which characters of intelligence are transmitted, by similar impulses of radio frequency propagation, utilizing a distinct frequency for each character.

The system includes means to elect the characters to be transmitted and received, radio frequency transmitting devices which generate the radio frequency transmitters' impulses, radio frequency receiving devices to translate the transmitting impulses to usable electrical energy to actuate a printer, and suitable signal devices to expedite the normal operation of the system.

The principal object of the invention resides in the provision of a wireless system comprising a series of substations, e. g., one in each department of an industrial plant, and a main station, e. g., for the head time keeper for the plant; each substation is provided with a radio call circuit to actuate a separate signal at the main station indicating the presence of intelligence at that particular substation for transmission to the main station; the latter having a control transmitter to then place the substation in operation, whereupon the substation operator may transmit characters to the main station where they are printed, each character having its own frequency.

Other objects and advantages of the invention will appear hereinafter.

Reference is to be had to the accompanying drawings in which

Figures 1, 2:
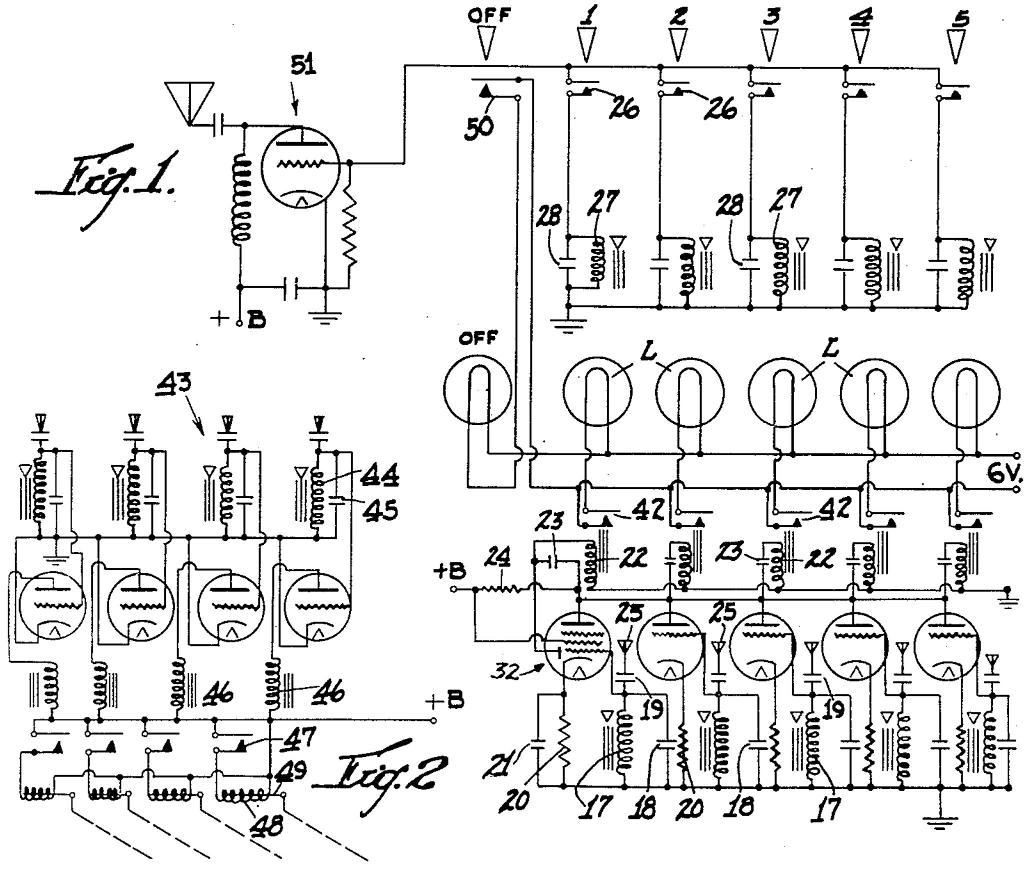
Fig. 1 is a circuit diagram showing the main station control system.
Fig. 2 is a circuit diagram showing the main station printer receiver.
Figure 3:
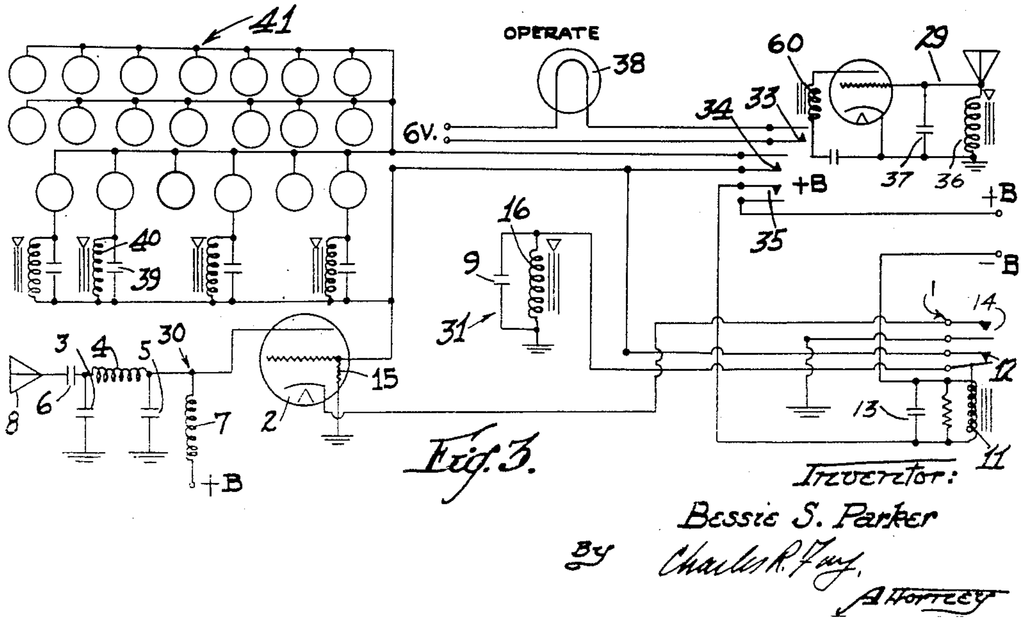
Fig. 3 is a circuit diagram showing the substation transmitting system.

The mechanical parts required are a roll with a rewinder and twenty typewriter keys which are ten numerals and ten letters or any combination thereof which can be changed to suit the users' code. The tape used on this typewriter is four inches wide and is carried back and forth as used, on a carrier attached to the under part of the roll.

Operation is carried out between a main station and any required number of substations. Operator at a substation pushes call button closing SPST contacts 14 of switch 1. This operation grounds the cathode of the triode vacuum tube 2, in the call transmitter 30. This completes the circuit of call transmitter 30 placing it in operation. With no current applied to relay winding 11, its contacts 12 are normally closed thereby inserting the call station tuned circuit 31 into the grid circuit of vacuum tube 2 of the call transmitter 30. The call signal tuned circuit 31 is composed of capacitor 9 and permeability tuned inductance 16 which together form a parallel resonant circuit which determines the frequency of call transmitter 30 while in this call position. Each substation calls on a separate and distinct frequency as determined at the tuned circuit 31 of each substation.

The transmitter 30 is a tuned grid oscillator consisting of triode vacuum tube 2 utilizing a plate, grid and heater, a tuned grid circuit, antenna tuning network 3, 4, 5, or choke 7 having a high impedance to radio frequencies, antenna coupling and isolating condenser 6, antenna 8 and grid bias resistor 15.

At the main station there is a call signal receiver 32 for each substation. Each receiver 32 is tuned to a call signal frequency of each one of the substations.

Each call signal receiver 32 utilizes a high sensitivity pentode diode vacuum tube with a heater, control grid, screen grid, a suppressor internally connected to the heater, a pentode plate, and a diode plate. This tube is used in a plate detector and diode rectifier circuit to accomplish its function. The plate detector circuit is composed of a parallel resonant grid circuit consisting of capacitor 18 and permeability tuned inductance 17, antenna coupling condenser 19, cathode bias resistor 20, cathode by pass condenser 21, antenna 25, pentode load resistor 24, pentode to diode coupling condenser 23, relay winding 22 and relay contacts 42. The frequency of detection is determined by the resonant frequency of 17 and 18. All receivers are identical.

The radio frequency signal from the substation transmitter is rectified by the detector action of the appropriate call signal receiver tuned to the call signal transmitter frequency. The average plate current of a plate detector increases upon application of signal voltage to the grid of the tube. This is explained by the fact that the tube is biased almost to cut off plate current by cathode resistor 20. The signal voltage consists of rapid variations of voltage of reversing polarity. On the negative half of the cycle the grid is driven further negative, cutting off plate current flow completely. On the positive half of the cycle the grid is made more positive than it was under static no signal conditions, thereby increasing the plate current. This action is called rectification or detection. Therefore, it is seen that the operation of this vacuum tube is such that the flow of plate current is inversely proportional to the amplitude of negative grid voltage in a relationship which is determined by the characteristics of the tube, and is quite linear over a fairly large range of grid bias voltages. This range is known as the linear portion of the grid voltage-plate current curve.

Condenser 21 ties the cathode to ground radio frequency potential (not D. C. potential) so that the cathode does not follow the rapid radio frequency variations applied to the grid. Were variations of the cathode permitted, due to instantaneous variations of plate current returning through cathode resistor 20, a degenerative effect would be set up which would rob the tube of a greater part of its sensitivity. The diode portion of the vacuum tube in parallel with pentode plate load resistor 24 comprises the plate load on the pentode portion of this vacuum tube. Condenser 23 couples the rectified plate voltage of the pentode to the plate of the diode.

The function of the receiver is to actuate the contacts 42 of the relay by providing sufficient plate current flow through winding 22. If relay winding 22 were placed in series with the pentode plate so that the pentode plate current flowed through the winding, the winding would then be the external load for the pentode. Because the impedance of the winding 22 is comparatively low and the plate impedance of the pentode very high, a serious mismatch between generator (the pentode vacuum tube) and load would occur. Therefore, a diode, consisting of a cathode which is the same cathode as that used for the pentode portion of the tube and a plate is used as a separate output stage, into whose plate circuit is placed winding 22. Plate current flowing from cathode to diode plate flows through winding 22. This plate current is directly proportional to the positive voltage applied to the diode plate. The rectified voltage developed at the plate of the pentode is applied directly, and in phase, to the plate of the diode through condenser 23. The diode provides a good match to winding 22.

It is seen from the foregoing that the signal from the substation is able to close contacts 42. Relay 22 is of a sensitive type requiring very low values of current to be actuated. The contacts 42 are in series with a 6 volt source so that when the aforementioned relay is actuated the 6 volt circuit is closed and the particular lamp L is lighted.

At the main station there are a number of parallel resonant circuits composed of condenser 28 and permeability tuned inductance 27. Each one of these tuned cricuits can be inserted into the grid circuit of control transmitter 51, thereby determining its frequency of oscillation.

Each tuned circuit 27, 28 is resonant at a separate frequency corresponding to the frequency of the control receiver 29 as determined by its resonant grid circuit 36, 37 at each substation. Therefore, it can be seen that there will be one tuned circuit 27, 28 on the control transmitter for each substation, each one tuned to the frequency of a different control receiver 29, capable of being inserted into the grid circuit of the control transmitter 51 at the main station. Switching is accomplished by a series of continuous wipe out switches 26 so that only one tuned circuit at a time can control the frequency of control transmitter 51. Control transmitter 51 is a tuned grid oscillator similar to the previously described substation transmitter 30.

When signal light goes on, the corresponding button 26 is depressed placing into the grid circuit control transmitter 51, the parallel resonant circuit 28, 27 the frequency of which is the same as the control receiver 29 at that particular substation. This operation places the main station in a control position of the substation by transmitting a control impulse to the control receiver 29.

Control receiver 29 utilizes a pentode-diode plate detector circuit and by an action identical to that previously described for the call signal receiver 32, closes contacts 33, 34, 35. Closing contacts 33 completes the 6 volt circuit and operate light 38 illuminates, indicating main station has performed necessary function. Closing contacts 35 completes relay winding circuit 11, causing current to flow in this winding. Contacts 12 normally closed as previously mentioned to place call signal tuned circuit 31 into grid circuit of transmitter 30, now open, removes call signal tuned circuit from transmitter 30.

Closing contacts 34 places any one of the parallel resonant circuits composed of condensers 39 and permeability tuned coils 40 in a position to be inserted into the grid circuit of transmitter 30. There are twenty of these tuned circuits 39, 40 and each tuned to a separate frequency and each representing a separate character on key board 41. Key board 41 is part of a conventional printer and tape puller. Each substation is equipped with a puller identical in every respect.

The substation has now been placed in a transmitting position by the main station as indicated by the illumination of the operate light 38.

The substation starts to transmit by depressing the appropriate keys 41. This operation places the appropriate tuned circuit 39, 40 into the grid circuit of transmitter 30. Inasmuch as each tuned circuit 39, 40 is resonant at a different frequency, there will be transmitted a radio-frequency impulse of separate and distinct frequency for each character on the key board.

At the main station there are twenty printer receivers 43. Each of these receivers utilizes a pentode-diode plate detector circuit identical to the call signal receiver 32 and the control receiver 29. Each of the printer receivers 43 is tuned to a frequency of a tuned circuit in the printer and tape puller, by means of condenser 45 and permeability tuned coil 44. Therefore, each radio frequency impulse produced at a frequency indirectly determined by key 41 and directly produced by tuned circuit 39, 40 will place a signal voltage of different frequency on the end of a separate printer receiver 43. By the action previously described for call signal receiver 32, current will flow in relay winding 46, closing contacts 47. When contacts 47 are closed sufficient current flows in solenoid winding 48 to actuate solenoid plunger 49. Solenoid plunger 49 is mechanically attached to another printer and tape puller.

In this manner twenty characters can be transmitted from the substation printer and tape puller to the main station printer and tape puller.

This is a simplex circuit and it is intended that intelligence shall be transmitted from substation to main station only.

At the end of transmission the main station acknowledges as correct by depressing off button 50, wiping off button 26, rendering control transmitter 51 inoperative. This operation drops the current in the relay winding 60 of control receiver 29, releasing contacts 33, 34, 35 thereby extinguishing operate light 38. If an error has been made, control transmitter 51 is left on and it will be known by operate light that error has been made and the message is to be repeated.

When several substations are ready to transmit at once each light will appear on the substation light panel located at the main station but transmission cannot commence until the control transmitter 51 places the substation in a transmit position. As each consecutive push button 26 releases the previously depressed button, only one substation can be placed in a transmit position at any one time. Latch release relay 11 has a one second delay due to the time constant of the resistor condenser combination 13, and will not release as substation selector switch goes through a cycle.

Having thus described my invention and the advantages thereof I do not wish to be limited to the details herein disclosed, otherwise than is set forth in the claims, but what I claim is:

1. A communication system having a plurality of controlling radio frequency carriers interlinking a main station and a sub-station, comprising a sub-station including a call button circuit, a radio frequency transmitter energized by the closing of said call button circuit, said transmitter radiating a call signal of a frequency characteristic of the particular sub-station, a main station including a radio receiver tuned to said sub-station transmitter, indicating means actuated by said call signal transmitted from the sub-station, a control transmitter circuit, energizing means for said transmitter to radiate a frequency conditioning signal of characteristic frequency, a conditioning receiver at the sub-station tuned to the characteristic frequency of the conditioning signal, an indicator actuated by the signal sent to the conditioning receiver, means for simultaneously de-energizing said call button circuit by said conditioning receiver, a sub-station character selector, means for simultaneously connecting the character selector to said sub-station transmitter by said conditioning receiver, said character selector including a plurality of keys each representative of a different character, a tuned circuit resonant at a different frequency for each key individually connected thereby to the sub-station transmitter for radiating a carrier signal of frequency corresponding to a particular character key, a main station printer including a plurality of receivers each tuned differently to correspond to the carrier frequency signal representative of each character key, a relay for each receiver operated thereby, a contact for each relay, and a solenoid operated printer for each contact.

2. The system according to claim 1, including means at the main station to de-energize the control transmitter, thus rendering the sub-station transmitter inoperative until conditioned again by the control transmitter at the main station.

3. A communication system having a plurality of controlling radio frequency carriers interlinking a main station and a substation comprising a sub-station including a call button circuit, a radio frequency transmitter energized by the closing of said call button circuit, said transmitter radiating a call signal of a frequency characteristic of the particular sub-station, a main station including a radio receiver tuned to said sub-station transmitter, indicating means actuated by said call signal transmitted from the sub-station, a control transmitter circuit, energizing means for said transmitter to radiate a frequency conditioning signal of characteristic frequency, a conditioning receiver at the sub-station tuned to the characteristic frequency of the conditioning signal, an indicator actuated by the signal sent to the conditioning receiver, means for simultaneously de-energizing said call button circuit by said conditioning receiver, a sub-station character selector, means for simultaneously connecting the character selector to said sub-station transmitter by said conditioning receiver, said character selector including a plurality of keys each representative of a different character, a tuned circuit resonant at a different frequency for each key individually connected thereby to the sub-station transmitter for radiating a carrier signal of frequency corresponding to a particular character key, a main station printer including a plurality of receivers each tuned differently to correspond to the carrier frequency signal representative of each character key, and a relay for each receiver operated thereby for controlling a solenoid printer.

4. A communication system having a plurality of controlling radio frequency carriers comprising a main station and a plurality of sub-stations interlinked thereby, each sub-station including a call signal circuit and a radio frequency transmitter energized by said signal circuit characteristic of the particular sub-station only, said main station including a plurality of radio receivers each tuned to the characteristic call signal of a particular sub-station, a control transmitter and means for energizing said transmitter to radiate a frequency conditioning signal characteristic of each sub-station, a conditioning signal receiver at each sub-station tuned to its particular frequency conditioning signal characteristic for conditioning the sub-station for transmitting a message, a character selector for each sub-station connected to the sub-station transmitter in response to said received conditioning signal, said character selector including a plurality of keys each representative of a different character, a tuned circuit resonant at a different frequency for each key individually connected thereby to the sub-station transmitter for radiating a carrier signal of frequency corresponding to a particular character key, a main station printer including a plurality of receivers each tuned differently to correspond to the carrier frequency signal representative of each character key, and a relay operated by each receiver for controlling a solenoid operated printer.

5. A communication system having a plurality of controlling radio frequency carriers comprising a main station and a plurality of sub-stations interlinked thereby, each sub-station including a call signal circuit and a radio frequency transmitter energized by said signal circuit characteristic of the particular sub-station only, said main station including a plurality of radio receivers each tuned to the characteristic call signal of a particular sub-station, indicating means actuated by said call signal, a control transmitter and means for energizing said transmitter to radiate a frequency conditioning signal characteristic of each sub-station, a conditioning signal receiver at each sub-station tuned to its particular frequency conditioning signal characteristic for conditioning the sub-station for transmitting a message, an indicator actuated by the signal sent to the conditioning receiver and means for simultaneously de-energizing said call signal circuit, a character selector for each sub-station connected to the sub-station transmitter in response to said received conditioning signal, said character selector including a plurality of keys each representative of a different character, a tuned circuit resonant at a different frequency for each key individually connected thereby to the sub-station transmitter for radiating a carrier signal of frequency corresponding to a particular character key, a main station printer including a plurality of receivers each tuned differently to correspond to the carrier frequency signal representative of each character key, and a relay operated by each receiver for controlling a solenoid operated printer.

6. A communication system having a plurality of controlling radio frequency carriers comprising a main station and a plurality of sub-stations interlinked thereby, each sub-station including a call signal circuit and a radio frequency transmitter energized by the closing of said call signal circuit for radiating a call signal of a frequency characteristic of the sub-station, said main station including a plurality of radio receivers each tuned to receive a call signal of one of said sub-station transmitters, a control transmitter circuit and means for energizing said transmitter to radiate a frequency conditioning signal characteristic of one of said sub-stations, a conditioning signal receiver at each sub-station tuned to a frequency conditioning signal characteristic of the particular sub-station, a character selector for each sub-station adapted to be connected to the sub-station transmitter by said conditioning signal receiver, said character selector including a plurality of keys each representative of a different character and each having a tuned circuit resonant at a different frequency adapted to be individually connected thereby to the sub-station transmitter for radiating a carrier signal of frequency corresponding to a particular character key, a main station printer including a plurality of receivers each tuned differently to correspond to the carrier frequency representative of each character key, and a solenoid operated printer energized by each receiver.

BESSIE S. PARKER.

REFERENCES CITED

The following references are of record in the file of this patent:

UNITED STATES PATENTS

| Number | Name | Date |
|---|---|---|
| 1,326,727 | Hammond | Dec. 30, 1919 |
| 1,356,488 | Compare | Oct. 19, 1920 |
| 1,476,003 | Martin | Dec. 4, 1923 |
| 1,523,377 | Brady | Jan. 13, 1925 |
| 1,661,692 | Robinson | Mar. 6, 1928 |
| 1,688,453 | Demarest et al. | Oct. 23, 1928 |
| 1,743,588 | Affel et al. | Jan. 14, 1930 |
| 1,889,292 | Ricchiardi | Nov. 29, 1932 |
| 1,975,486 | Thomas | Oct. 2, 1934 |
| 2,047,900 | Bruckel | July 14, 1936 |
| 2,058,398 | Bear | Oct. 27, 1936 |
| 2,173,154 | Bernard | Sept. 19, 1939 |
| 2,301,475 | Suren et al. | Nov. 10, 1942 |
| 2,383,908 | Bowers | Aug. 28, 1945 |
| 2,458,558 | Bradley | Jan. 11, 1949 |